UNITED STATES PATENT OFFICE.

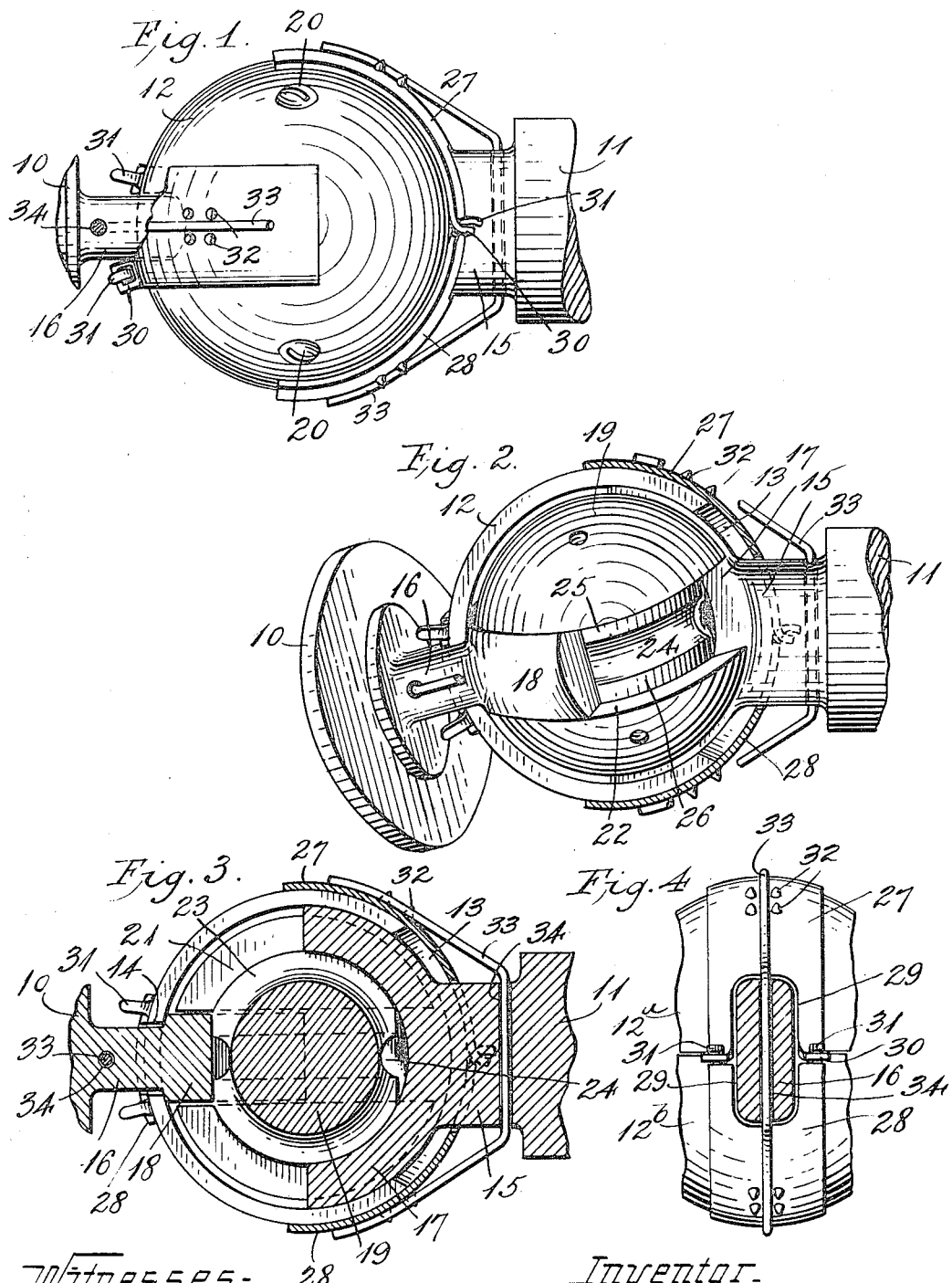

ISADOR LEHMAN, OF CLEVELAND, OHIO.

SHAFT-COUPLING.

1,148,594.    Specification of Letters Patent.    Patented Aug. 3, 1915.

Application filed January 29, 1913. Serial No. 744,861.

*To all whom it may concern:*

Be it known that I, ISADOR LEHMAN, a citizen of the United States, residing at Cleveland, in the county of Cuyahoga and State of Ohio, have invented certain new and useful Improvements in Shaft-Couplings, of which the following is a specification.

This invention relates to improvements in universal joint construction, and particularly to mechanism for protecting the slots in a spherical housing inclosing the parts of the joint.

More specifically the invention relates to a pair of protector plates removably secured together and adapted to embrace the shank of the shaft section entering the joint and prevent the entrance of dust and dirt into the joint, these plate portions being held in place by suitable spring devices.

The invention may be further briefly summarized as consisting in the construction and combination of parts hereinafter set forth in the following description, drawings and claims.

Referring to the drawings, Figure 1 is an elevation of the joint showing a portion of one of the protector plates broken away; Fig. 2 is a similar view with one of the spherical housing portions removed; Fig. 3 is a longitudinal section; and Fig. 4 is a plan view of the protector plates secured together in place with the adjacent parts partly in elevation and partly in section.

Referring now to the figures of the drawing, wherein I have shown the preferred embodiment of my invention, 10 and 11 represent respectively the adjacent ends of two shafts or power transmitting members which are designed to be coupled together by my improved coupling which includes a casing 12 preferably in the form of a spherical shell having inner and outer spherical surfaces which are concentric with respect to each other. This shell is divided into halves $12^a$ and $12^b$ and is provided with two elongated arc-shaped slots 13 and 14 which are diametrically opposite and are arranged at right-angles to each other, the line of division between the halves of the shell dividing the slot 13 centrally and longitudinally and the slot 14 centrally but transversely, so that the parts of the coupling may be readily assembled or taken apart as will appear presently.

The shaft sections 10 and 11 are provided with rectangular-shaped shanks 15 and 16 which extend through the slots 13 and 14 respectively of the casing and at their inner ends are provided with half-circular forks or jaws 17 and 18 which, as will be explained presently, form part of the coupling.

On the interior of the casing is a spherical bearing member 19 of a size such that it fits closely within the casing and engages the inner spherical surface of the latter. The spherical bearing member 19 is preferably held from movement within the casing by means of screws 20 which pass through each half of the casing into the member 19, the screws being 90° apart and entering the member 19 midway between annular working grooves therein as shown in Fig. 2. The sphere or spherical member 19 is provided with two peripheral annular bearing or working grooves 21 and 22 which extend completely around the sphere centrally thereof, and are arranged so that they intersect each other at right-angles, these grooves, as will be apparent from the drawing, receiving and guiding the forks or jaws 17 and 18 at the ends of the shaft sections. Each of the grooves has parallel side walls and a bottom wall which is annular and preferably cylindrical, the cylindrical surfaces having their axes passing through the center of the sphere. Each of the forks or jaws 17 and 18 is of a size and shape such that it fits snugly but with good working fit into the corresponding annular grooves 21 or 22, each of these forks having an inner cylindrical surface adapted to engage the cylindrical inner or bottom of the corresponding groove, and having parallel sides which are adapted to engage the parallel side walls of the groove, and having also an outer surface spherical in contour and adapted to bear against the overlying portion of the inner spherical surface of the shell or casing 12. As before stated, each of the forks or jaws is half circular or extends half way about the corresponding annular groove in the sphere. This construction leaves ample space for the jaws to work freely relative to one another as will be apparent from the inspection of Figs. 2 and 3, the remaining space of each bearing groove in the sphere not occupied by the half circular fork or jaw being designed to be filled with a lubricant, which will be forced back and forth in the groove and between the bearing and working surfaces of the forks, sphere 19, and shell 12 against which the forks bear.

To enhance the lubrication of the working parts and to increase the space for the lubricant the inner or lower portions of the two working grooves 21 and 22 are provided with centrally disposed annular grooves 23 and 24, each being preferably substantially half round in cross section and being located midway between the parallel side walls of the groove so as to leave annular cylindrical shoulders or bearing surfaces 25 and 26 for the inner surfaces of the corresponding fork or jaw. These grooves 23 and 24 as well as the unoccupied spaces in the bearing grooves 21 and 22 will be preferably filled with a good lubricant preferably in the form of a semi-liquid mass.

Thus it will be seen that with this construction the back or outward thrust of the shafts will be taken or resisted by the inner spherical surface of the casing and the inner thrust will be taken by the cylindrical bottom surfaces of the bearing grooves 21 and 22 while the parallel sides of the grooves and the parallel sides of the forks or jaws form bearing or working surfaces in the transmission of power between the shaft sections. It may be noted also at this point that the construction of the coupling is extremely simple and the coupling is inexpensive to manufacture although very efficient, it will have long life, ample bearing surfaces are provided, and all parts will be thoroughly lubricated with the result that friction is minimized.

To exclude the dust from the interior of the casing, I provide removable closures for the elongated slots 13 and 14 through which the shaft sections extend, and these closures are in the form of a pair of protector plates 27 and 28 adapted to fit snugly against the exterior of the spherical casing, and each provided with a recess 29 extending in from one end, the remaining side portions of the protector plate 27 being provided with eyes or openings 30 for the reception of fingers 31 carried by the side portions of the protector plate 28. The fingers 31 are bent radially with respect to the spherical casing and the eyes formed by the openings 30 are bent in the same direction so that the parts when hooked together are drawn snugly against the spherical casing. In order to hold these protector plates in place, each is provided with spaced projections 32 adapted to receive between them a retainer spring member 33 mounted in the shank of the corresponding shaft section. These retainer spring members are preferably formed from a single piece of wire which passes through an opening 34 in the corresponding shank and retain the protector plates in place at all times.

It will be seen from the foregoing that if the user desires to remove the protector plates, he raises the retainer spring members and removes them from between the projections 32. The protector plates are then moved outward from the spherical casing and are unhooked.

Having described my invention, I claim:—

1. In a shaft coupling, a pair of shaft sections, each having a neck and a pair of jaws at the end of said neck, an inner member having recesses for receiving the jaws of the two shaft sections, a spherical casing inclosing said parts and having slots therein for receiving the necks of the shaft sections, and a closure for each of said elongated slots and comprising a pair of plates, means for holding said plates movably together at the corresponding neck, and means for holding said plates in place upon the spherical casing.

2. In a shaft coupling, a pair of shaft sections, a spherical casing having an elongated slot through which one of said shaft sections extends, a removable closure for said elongated slot comprising a pair of protector plates, each provided with a recess for receiving a portion of the shaft section, one of said protector plates on each side of said shaft section having eyes and the other of said plates at a corresponding point having hooks for engagement with said eyes, and means for clamping said protector plates against the spherical casing.

3. In a shaft coupling, a pair of shaft sections, a universal joint connector, a casing therefor having elongated slots for the shaft sections, a removable closure for each of said slots comprising a pair of plates recessed at corresponding ends to receive the shaft section, one of said plates having upturned eyes at the ends of the portions upon the sides of the shaft section, and the other having hooks for engagement in said eyes, a retaining spring carried by the corresponding shaft section engaging the plates to hold them in place, and means for holding said springs in place.

In testimony whereof I affix my signature in presence of two witnesses.

ISADOR LEHMAN.

Witnesses:
  G. O. FARQUHARSON,
  C. H. TRESCH.